United States Patent [19]
Grudkowski et al.

[11] Patent Number: 5,166,766
[45] Date of Patent: Nov. 24, 1992

[54] THICK TRANSPARENT SEMICONDUCTOR SUBSTRATE HETEROJUNCTION ACOUSTIC CHARGE TRANSPORT MULTIPLE QUANTUM WELL SPATIAL LIGHT MODULATOR

[75] Inventors: Thomas W. Grudkowski; Robert N. Sacks, both of Glastonbury, Conn.

[73] Assignee: United Technologies Corporation, Hartford, Conn.

[21] Appl. No.: 777,884

[22] Filed: Oct. 15, 1991

[51] Int. Cl.$^5$ ............................................. H01L 27/14
[52] U.S. Cl. .................................... 257/15; 359/248; 359/305; 359/306; 359/285; 257/21; 257/22; 257/254; 257/416
[58] Field of Search ............ 357/26, 25, 16, 4, 24 LR, 357/30 E, 30 Q; 359/248, 305, 306, 307, 312, 285

[56] References Cited

U.S. PATENT DOCUMENTS

| | | | |
|---|---|---|---|
| 4,348,650 | 9/1982 | Minagawa et al. | 357/26 X |
| 4,633,285 | 12/1986 | Hunsinger et al. | 357/26 X |
| 4,893,161 | 1/1990 | Tanski et al. | 357/24 M |
| 5,053,843 | 10/1991 | Choudhury et al. | 357/15 X |

OTHER PUBLICATIONS

W. D. Goodhue et al, "Quantum-well charge-coupled devices for charge-coupled device-addressed multiple—quantum-well spatial light modulators", *Journal of Vacuum Science and Technology B*, vol. 4, No. 3, May/-Jun. 1986, pp. 769-772.

Primary Examiner—William Mintel
Attorney, Agent, or Firm—Gerald L. DePardo

[57] ABSTRACT

A one-dimensional or two-dimensional transmission mode spatial light modulator (SLM) includes one or more heterojunction acoustic charge transport (HACT) channels 18 with surrounding layers 16,20 vertically adjacent to a multiple quantum well (MQW) region 14, grown above a thick semiconductor substrate 10 thick enough to allow a surface acoustic wave (SAW) to propagate and transparent to the incident light 40. The SAW is injected by a transducer 24, charge is carried to and from the HACT channel 18 by electrodes 32,34,36, and light 40 is applied to a surface 44 perpendicular to the MQW region 14. Each charge packet 19 in the HACT channel 18 invokes an electric field 52 within the MQW region 14 which determines the optical absorption and index-of-refraction thereof, thereby determining the intensity and/or phase of each output light beam 45. Light modulation is achieved by modulating the amount of charge injected.

7 Claims, 2 Drawing Sheets

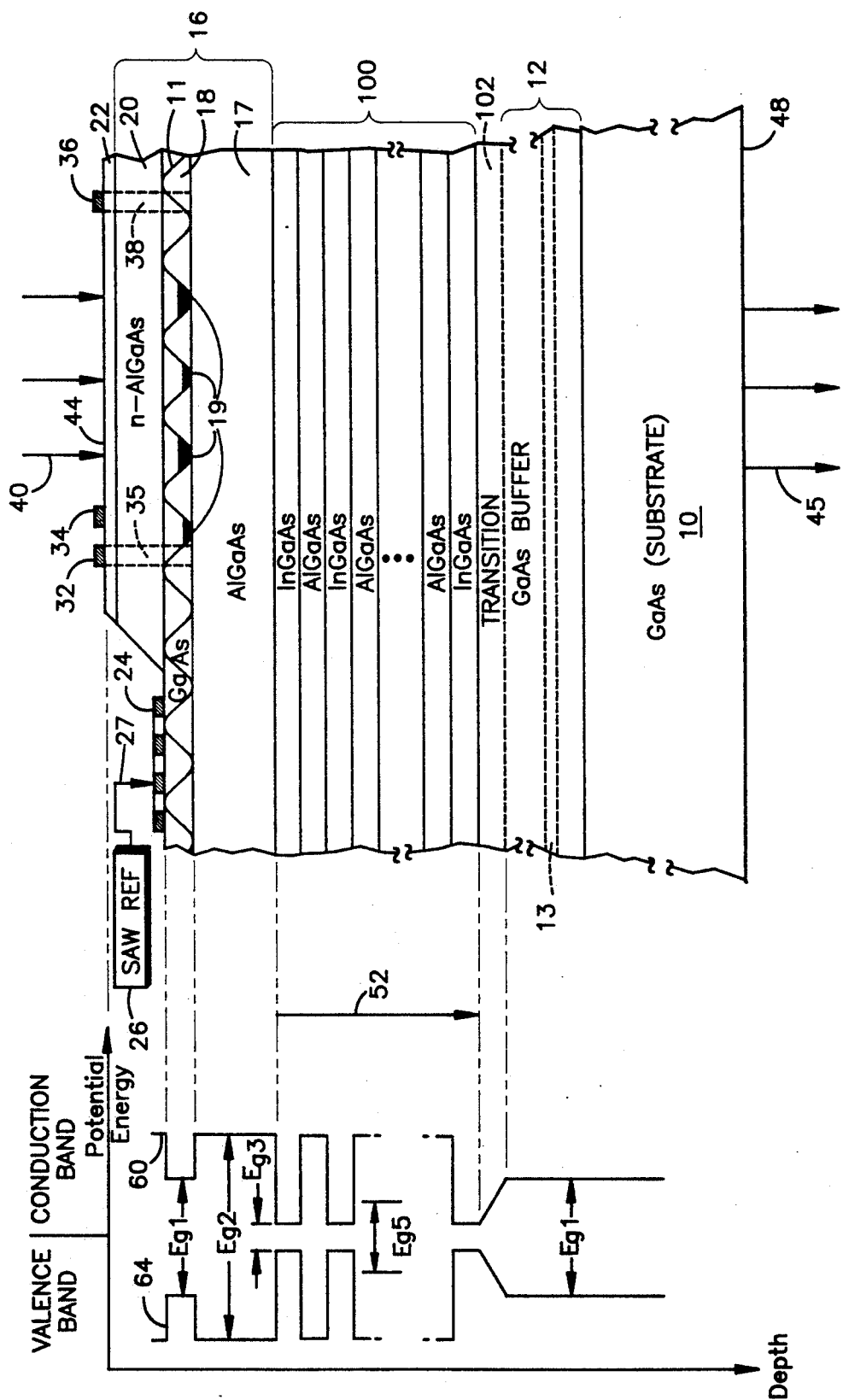

THICK TRANSPARENT SEMICONDUCTOR SUBSTRATE HETEROJUNCTION ACOUSTIC CHARGE TRANSPORT MULTIPLE QUANTUM WELL SPATIAL LIGHT MODULATOR

CROSS REFERENCE TO RELATED APPLICATIONS

Copending U.S. patent applications, entitled, "Thick Transparent Epitaxial Layer Heterojunction Acoustic Charge Transport Multiple Quantum Well Spatial Light Modulator", and "Dual Medium Heterojunction Acoustic Charge Transport Multiple Quantum Well Spatial Light Modulator", Ser. No(s). 07/778,043 and 07/777,883, respectively, filed contemporaneously herewith contain related subject matter to that disclosed herein.

TECHNICAL FIELD

This invention relates to spatial light modulators and more particularly to transmission mode spatial light modulators having a heterojunction acoustic charge transport (HACT) channel, a multiple quantum well region, and a thick semiconductor substrate.

BACKGROUND ART

A spatial light modulator (SLM), as is known, is a device which converts an input light beam, incident on a surface of the device, to an intensity or phase modulated output light beam in response to an electrical or optical input signal. A transmission mode SLM alters the optical absorption and/or index-of-refraction of the device as light passes through it, and uses the remaining light beam as the output beam (as apposed to projecting the input light at an angle to a surface and having the reflected portion of the beam be the output). An SLM, as is known, is very useful for one-dimensional and two-dimensional optical processing, including: matrix multiplication, spatial correlation, and Fourier transformation. It is also known that a charge coupled device (CCD) may be used with a multiple quantum well (MQW) region (described hereinafter) to make an SLM, as described in the article: W. D. Goodhue et. al., "Quantum-well Charge-coupled Device For Charge-coupled Device Addressed Multiple-quantum-well Spatial Light Modulators", *Journal of Vacuum Science and Technology*, Vol. 4, No. 3, (May/June 1988).

A CCD, as is known, transports an input charge from one temporary storage site to another, at or slightly beneath the surface of a semiconductor. The charge is transferred from one location to the next by electrical clock pulses applied to a series of electrodes mounted to the surface of the CCD.

An MQW, as is known, is a region comprising alternating semiconductor layers, such as gallium arsenide (GaAs) and aluminum gallium arsenide (AlGaAs, also written as $Al_xGa_{1-x}As$ or (Al,Ga)As). The layers of the MQW region have a band-gap energy (i.e., the energy between the valence band and the conduction band for a given layer) pattern which alternates from one layer to the next, also known as multiple quantum wells (MQWs).

To create an SLM with a CCD, the MQW region is placed below the charge transportation area of the CCD. When a given input charge magnitude is above the MQW region, it invokes an electric field within the MQW, which causes the optical absorption coefficient of the MQW to change in response thereto. Thus, if a light beam is passed through the MQW, the magnitude of the charge present at a given time will determine the absorption of light by the MQW. More specifically, it is known that an electric field applied within the MQW changes the quantum energy levels of electrons and holes, which affects its absorption characteristics.

It is also known that the optical absorption coefficient ($\alpha$) of a semiconductor varies as a function of the optical energy (Eo) of the photons of the incident light. The optical energy Eo is defined as: $Eo = h\nu = hc/\nu$, where h is Plancks constant; $\lambda$ is the frequency, c is the velocity of light; and $\lambda$ is the wavelength of the incident light. Thus, the absorption coefficient $\alpha$ varies as the optical wavelength $\lambda$ varies. If the energy Eo of the photons is below the band-gap energy (Eg), also known as the absorption band edge, for the semiconductor, minimal photons are absorbed thereby. Conversely, if the energy Eo of the photons is greater than the band-gap energy Eg, the semiconductor will readily absorb the photons.

The MQW region, as is known, provides an optical absorption characteristic which can be treated as having a effective collective energy band-gap (more precisely called an optical absorption threshold) for the entire MQW region, between the bulk band-gaps of the two semiconductors used, i.e., larger than GaAs and smaller than AlGaAs, which varies with applied electric field strength. The MQW absorption threshold is due to the quantum-size and two-dimensional excitonic effects, as is known. Its variation is known as the quantum confined Stark effect which is due to a shift in excitonic absorption with applied electric field, as described in the article: Miller et al, "Electric Field Dependance of Optical Absorption Near Bandgap of Quantum Wells Structure", *Phys. Rev. B*, Vol 32, Pg 1043 (1985). Because the MQW absorption threshold is less than the band-gap energy of AlGaAs (the material in the MQW having the larger band-gap) it allows photon with energy smaller than the bulk AlGaAs band-gap to be absorbed by the MQW. Thus, optical energy of the incident light can be absorbed by the MQW but not absorbed by AlGaAs layers external to the MQW region.

Using a CCD to create an SLM has numerous drawbacks. First, the useful optical area of a CCD SLM is severely limited because the CCD requires electrodes to be located on the same surface that the input light is incident on. Also, a CCD requires clock circuits to move the charge from one location to the next along the device, thereby requiring extra circuitry on the substrate or external thereto. Furthermore, a wire or thin film metal interconnect must be connected to each electrode to provide a clocking voltage thereto, thereby requiring many wires and/or interconnects for a high density optical application. Because of these limitations, desirable high density one and two-dimensional SLM's may not be obtained without a severe size penalty and added complexity which decreases yield and increases cost.

DISCLOSURE OF THE INVENTION

Objects of the invention include provision of a spatial light modulator (SLM) which does not require clock circuits or electrodes to move the input charge through the device, which allows either one-dimensional or two-dimensional high density operation in a small package size, and which can be grown from a substrate that does not need to be removed.

According to the present invention, an SLM is designed using a heterojunction acoustic wave transport (HACT) channel to transport charge using a surface acoustic wave near a multiple quantum well (MQW) region having an optical characteristic which varies with the strength of an electric field applied therein; the MQW region is grown above a thick semiconductor substrate transparent to incident light, having a minimum thickness to allow the surface acoustic wave (SAW) to propagate therein.

The invention represents a significant improvement over previous SLM techniques by eliminating the CCD clock circuits and surface mounted electrodes for applying the clock voltages. Furthermore, since no electrodes block the incident light, the useful optical area of the device is increased. Moreover, high density two-dimensional SLMs are easily fabricated because no wires or interconnects are required for charge propagation. Still further, by using a substrate transparent to the incident light, the substrate need not be removed to prevent optical absorption thereby.

The foregoing and other objects, features, and advantages of the present invention will become more apparent in light of the following detailed description of exemplary embodiments thereof, as illustrated in the accompanying drawings.

BRIEF DESCRIPTION OF THE DRAWINGS

FIG. 2 is a cross sectional cut-away view showing the layers of a spatial light modulator (SLM) with a surface acoustic wave (SAW) superimposed on a charge transport channel showing the potential wells created by the SAW at an arbitrary fixed time, including a plot of the potential energy of electrons in both the valence band and conduction band for various depths of the SLM, in accordance with the present invention.

BEST MODE FOR CARRYING OUT THE INVENTION

Figure 1:
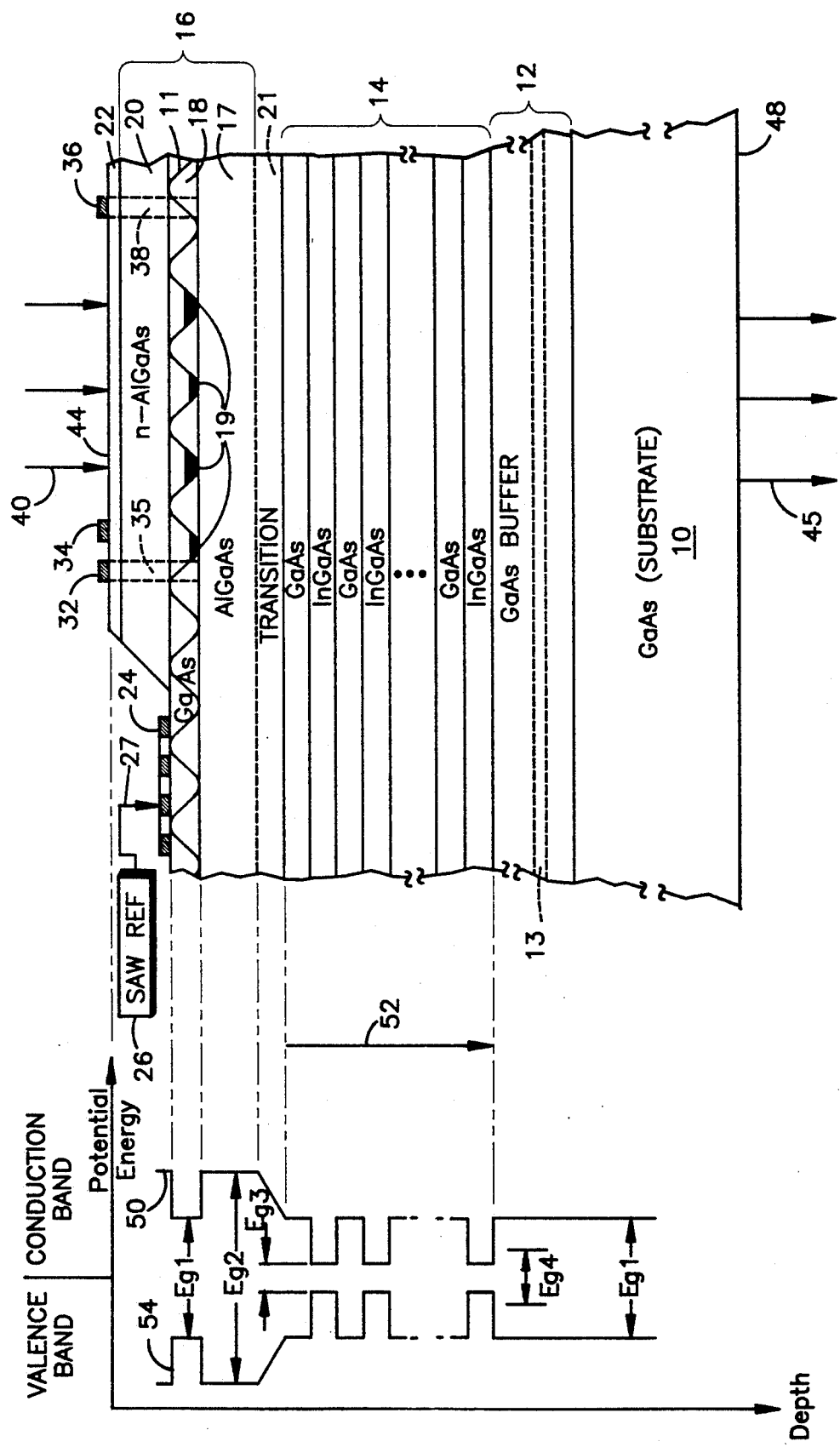
FIG. 1 is a cross sectional cut-away view showing the layers of a spatial light modulator (SLM) with a surface acoustic wave (SAW) superimposed on a charge transport channel showing the potential wells created by the SAW at an arbitrary fixed time, including a plot of the potential energy of electrons in both the valence band and conduction band for various depths of the SLM, in accordance with the present invention.

Referring to FIG. 1, the invention uses a thick semiconductor substrate 10, e.g., GaAs, having a thickness of about 500 micrometers (microns) or 20 mils (20×20 inches). Other thicknesses may be used if desired. However, the GaAs substrate 10 must have a thickness of at least one wavelength of a surface acoustic wave (SAW) 11 injected in the material, e.g., 20 microns SAW wavelength at a SAW frequency of 140 MHz. If the substrate 10 is not thick enough, the SAW will not propagate, thereby preventing acoustic charge transportation through the device, as described in copending U.S. patent application Ser. No. 07/778,043, filed contemporaneously herewith, entitled "Thick Epitaxial Layer Heterojunction Acoustic Charge Transport Multiple Quantum Well Spatial Light Modulator". It should be understood that the SAW travels throughout the entire device down to a depth of approximately 1 to 2 SAW wavelengths, as described in the aforementioned copending patent application. Also, the thickness of the layers of FIG. 1 are not drawn to scale.

Grown above the GaAs substrate 10 is an optional buffer layer 12 having a thickness of 1 micrometer (micron). The buffer layer 12, as is known, is used to provide a clean GaAs substrate layer from which to grow the remaining layers of the device. A region 13 of the buffer layer may be doped to assist in providing a vertical electric field 52 within the MQW, as described in the aforementioned patent application. The location and doping of the doped region 13 should be consistent with that described in the aforementioned patent application.

Above the GaAs layer 12 is a region 14 of alternating layers of indium gallium arsenide (InGaAs) and GaAs, also known as a multiple quantum well (MQW) region 14. The MQW region 14, as is known, provides layers having alternating band-gaps $Eg_1, Eg_3$ (FIG. 1) which have an optical absorption coefficient that changes as a function of the magnitude of an electric field 52 applied therein, as discussed hereinbefore, and described in detail in the aforementioned patent application.

The MQW region 14 comprises 50 to 60 layers of alternating GaAs and InGaAs, each having a thickness of 6 nanometers (nm) and each layer being not intentionally doped (NID). More or less layers may be used if desired; however, the more layers used, the larger the change in optical absorption as a function of electric field strength, as is known. The concentration of In in the InGaAs is 5% to 25%. Other concentrations may be used if desired; however, as the concentration of In increases, lattice mismatch between adjacent layers also increases, which can cause undesirable effects in overall device performance both electrically (to the HACT channel) and optically (to the MQW) due to the resulting generation of large concentrations of crystal dislocations, as is known. Other and/or non-repetitive thicknesses of the MQW layers may be used if desired.

Epitaxial growth and lattice mismatch requirements for the MQW are further discussed in the articles: S. Niki et al., "Molecular beam epitaxial growth and properties of highly strained $In_xGa_{1-x}As/GaAs$ multiple quantum wells", *Journal of Crystal Growth*. 1991 pg. 419–423, and L. Chen et al., "Realization of sharp excitonic features in highly strained $GaAs/In_xGa_{1-x}As$ multiple quantum wells grown on GaAs(100) substrates", *Journal of Crystal Growth*. 1991 pg. 424–428.

Referring to FIG. 1, various band-gap energies $Eg_1, Eg_2, Eg_3, Eg_4$, between the conduction band and valence band, are shown as the distance between a curve 50 and a curve 54 as a function of depth into the device. The band-gap energy Eg of the InGaAs is more narrow than the band-gap energy $Eg_1$ of the GaAs. Also, the effective band-gap Eg of the MQW region 14 is wider than the band-gap $Eg_3$ of the InGaAs, narrower than the band-gap $Eg_1$ of the GaAs, and, as described in the aforementioned patent application, varies with electric field strength. Furthermore, the band-gap $Eg_2$ of the AlGaAs is wider than both the band-gap $Eg_1$ of the GaAs and the band-gap $Eg_3$ of the InGaAs. Consequently, the energy of the incident light may be absorbed by the MQW region 14 and not absorbed by the GaAs substrate 10 nor the AlGaAs layers (discussed hereinafter). This allows the semiconductor substrate 10 to remain in-tact, i.e., it alleviates the need to remove the substrate for transmission devices, as described in the article: B. Pezeshki et.al., "Electroabsorptive Modulators in InGaAs/AlGaAs", *Applied Physics Letters*, Vol. 59, No. 8, (Aug. 1991). Other semiconductor materials may be used for the MQW region 14 provided the region has alternating energy band-gaps (e.g., $Eg_1$ and Eg$_3$) and the collective band-gap energy of the MQW is less than the band-gap energy of one of the materials used in the MQW region 14 and greater than the band-gap energy of the other material used in the MQW region 14.

As discussed in the aforementioned patent application, it is known that for a given input optical energy, the optical absorption of the MQW changes by a known amount when the applied electric field 52 changes. This shift in absorption band edge or band-gap energy of the MQW directly relates to a change in optical intensity of light passed through the MQW.

Above the MQW region 14 is a charge transport region 16 comprising layers 17,18,20. The composition, doping, and thicknesses of the layers 17,18,20 are as described in the aforementioned patent application. This region 16 serves to confine and transport injected charge along the SAW 11 which propagates along a HACT channel 18 as described in the aforementioned patent application. Charge packets 19 serve to apply electric fields within the MQW as also described in the aforementioned patent application. An optional transition layer 21 having a thickness of 200 Angstroms may be between the charge transport region 16 and the MQW region 14 to avoid an abrupt transition in potential, thereby helping to maintain a GaAs energy level consistent with the remaining GaAs layers of the MQW. The transition layer 21 has a concentration of Al that changes from 30% at the top to 0% at the bottom.

Above the charge transport region 16 is the cap layer 22 made of GaAs, the same thickness as that described in the aforementioned patent application.

A SAW transducer 24 is driven by a voltage source (SAW Ref) 26 on lines 27. The transducer 24 and SAW Ref 26 are the same as that described in the aforementioned patent application. Input electrodes 32,34 inject and control charge in the HACT channel 18 and the material 35 below the electrode 32 is doped to facilitate such charge injection, as described in the aforementioned patent application. Charge is extracted from the HACT channel 18 by an output electrode 36 and the material 38 below the output electrode 36 is doped to facilitate such transfer, as described in the aforementioned patent application.

One or more light beams 40 are incident on a surface 44 of the device, pass through the layers 10-22, and exit as output light beams 45 from a surface 48, as described in the aforementioned patent application.

Referring now to FIG. 2, a different MQW region 100 is composed of alternating regions of InGaAs and AlGaAs, in an alternative embodiment. The concentration of In in InGaAs is 5% to 25% and the concentration of Al in AlGaAs is 20% to 30%, as described in the aforementioned article, B. Pezeshki et. al. Other concentrations may be used if desired; however the same hereinbefore mentioned limitation on In concentration is recommended. This region 100 should be designed to have an effective band-gap Eg$_5$ greater than the band-gap Eg$_3$ of InGaAs and less than the band-gap Eg$_1$ of the GaAs substrate 10 to allow light to not be absorbed by the substrate 10. An optional transition layer 102 may be placed between the MQW region 100 and the buffer layer 12 having a thickness of 200 Angstroms. Other thicknesses may be used if desired. The optional transition layer 21 (FIG. 1) is not present in this embodiment because the AlGaAs layer 17 is made of the same material as one of the materials used in the MQW region 100. The layer 102 has a 25% concentration of In at the top and a 0% concentration of In at the bottom. This layer 102 serves the same purpose as the optional transition layer 21 in FIG. 1.

It should be understood that the alternatives to and variations on the surfaces to receive the incident light, the charge injection techniques, the placement of the MQW region relative to the charge transport region, the type of charge transported, the optical parameters varied, one-dimensional and two-dimensional configurations, and additional doping for an inherent electric field, discussed in the aforementioned patent application are also applicable to the present invention.

Although the invention has been described and illustrated with respect to exemplary embodiments thereof, it should be understood by those skilled in the art that the foregoing and various other changes, omissions and additions may be made without departing from the spirit and the scope of the invention.

We claim:

1. A spatial light modulator, comprising:
   a thick semiconductor substrate, transparent to incident light;
   a multiple-quantum-well region, disposed above said thick semiconductor substrate, having the incident light passed therethrough, having an optical absorption threshold energy smaller than the band-gap energy of said thick semiconductor substrate and substantially equal to the energy of the incident light, and having an optical parameter which is altered in response to an electric field applied therein;
   a charge transport region, made of piezoelectric semiconductor material, located contiguous with said multiple-quantum-well region, and having a charge transport channel therein, for transporting charge along said charge transport channel using a surface acoustic wave, said charge applying said electric field within said multiple-quantum-well region, and for preventing the escape of charge from said charge transport channel;
   said thick semiconductor substrate having a thickness such that the overall thickness of said thick epitaxial semiconductor layer, said multiple-quantum-well region, and said charge transport region allows a surface acoustic wave to propagate therein;
   charge supply means for passing said charge to and from said charge transport channel; and
   surface acoustic wave means, disposed above said thick semiconductor substrate, for launching said surface acoustic wave along said charge transport channel within said charge transport region.

2. The spatial light modulator of claim 1 wherein said thick semiconductor substrate comprises GaAs.

3. The spatial light modulator of claim 1 wherein said optical parameter altered by said multiple-quantum-well region is the optical absorption thereof.

4. The spatial light modulator of claim 1 wherein said multiple-quantum-well region has a plurality of alternating layers of two different semiconductor materials.

5. The spatial light modulator of claim 4 wherein said two different semiconductor materials are InGaAs and GaAs.

6. The spatial light modulator of claim 4 wherein said two different semiconductor materials are InGaAs and AlGaAs.

7. The spatial light modulator of claim 1 wherein said charge transport region comprises a HACT channel made of GaAs, as said charge transport channel, surrounded on upper and lower surfaces by charge confinement layers formed from AlGaAs.

* * * * *